United States Patent [19]

Sakashita et al.

[11] Patent Number: 5,192,996
[45] Date of Patent: Mar. 9, 1993

[54] VIDEO CHROMA SIGNAL PROCESSING CIRCUIT

[75] Inventors: Hirohiko Sakashita, Nara; Tetsuo Kutsuki, Toyonaka; Naoji Okumura, Minoo, all of Japan

[73] Assignee: Matsushita Electric Industrial Co., Ltd., Osaka, Japan

[21] Appl. No.: 788,240

[22] Filed: Nov. 5, 1991

[51] Int. Cl.[5] .................................. H04N 9/77
[52] U.S. Cl. ..................... 358/21 R; 358/40; 358/39
[58] Field of Search ............... 358/39, 40, 38, 21 R, 358/31

[56] References Cited

U.S. PATENT DOCUMENTS

| | | | |
|---|---|---|---|
| 4,219,838 | 8/1980 | Rossi | 358/21 R |
| 4,386,434 | 5/1983 | Gibson et al. | 358/38 |
| 4,456,922 | 6/1984 | Balaban et al. | 358/31 |
| 4,991,003 | 2/1991 | Sendelweck | 358/38 |
| 5,081,537 | 1/1992 | Itou | 358/40 |

Primary Examiner—James L. Dwyer
Assistant Examiner—Jeffrey S. Murrell
Attorney, Agent, or Firm—Stevens, Davis, Miller & Mosher

[57] ABSTRACT

A video chroma signal processing circuit in which a composite video signal, formed of an analog luminance signal and an analog chrominance signal, is separated into Y and C components and converted into digital codes by AD converters and processed by processing circuits. The outputs of the processing circuits are converted into analog signals again with DA converters to produce a picture image; wherein, it is intended to obtain a wide band of a luminance signal by making efficient use of an AD converter for a chrominance signal and to improve horizontal resolution. The apparent sampling frequency is doubled by sampling the AD converter for a chrominance signal with a phase reverse to that of an AD converter for a luminance signal so as to improve the horizontal resolution of the luminance signal.

5 Claims, 2 Drawing Sheets

VIDEO CHROMA SIGNAL PROCESSING CIRCUIT

BACKGROUND OF THE INVENTION

The present invention relates to a video chroma signal processing circuit in an equipment operating with video signals such as a television receiver and a video cassette recorder (VCR), and more particularly to a video chroma signal processing circuit which reproduces a video signal having a frequency higher than the frequency (the frequency limited by what is called the sampling theorem) which is one half of a sampling clock frequency of an AD converter.

Digital equipments operating with video signals have been in progress of late years. Such a trend has also extended to television receives, VCRs and the like which are public equipments. This is a technique expected much by which not only reduction by the quantity of components and improvement of reliability are expected, but also development to EDTV becomes easier for a video chroma signal processing circuit by means of digital techniques.

In video chroma signal processing digital circuits, a frequency characteristic of a luminance signal is limited to one half of a sampling clock of an AD converter by what is called the sampling theorem. A frequency which is used frequently as a sampling clock of an AD converter is at 14.31818 MHz which is four times as high as a subcarrier frequency. In this case, the maximum frequency which passes through reaches approximately 7.1 MHz, which produces approximately 570 lines if computed in terms of horizontal resolution. On the other hand, the horizontal resolution at 700 lines to 750 lines are required as the performance demanded for a high grade television receiver in the domestic market. Therefore, it is impossible to reproduce the horizontal resolution demanded in the market in general with a conventional sampling frequency at 14.31818 MHz.

An example of an above-described conventional video chroma signal processing circuit applied with digital signal processing will be described hereinafter.

FIG. 1 shows a block diagram of an example of a conventional video chroma signal processing circuit applied with digital signal processing. In FIG. 1, a reference numeral 21 denotes a first AD converter which receives an analog composite video signal and converts that signal into a digital code. 22 denotes a second AD converter which receives a chroma signal separated from a luminance signal when inputted and converts the chroma signal into a digital code. 23 denotes a luminance signal processing circuit which receives the output signal of the first AD converter 22 and performs appropriate luminance signal processing such as contrast adjustment and contour correction. 24 denotes a first DA converter which receives the output signal of the luminance signal processing circuit 23 and converts a digital code into an analog signal. 25 denotes a multiplexer circuit which receives the output signal of the first AD converter 21 and the output signal of the second AD converter 22 and outputs the output signal of the first AD converter 21 at time of composite video signal demodulation and outputs the output signal of the second AD converter 22 when the analog luminance signal and the analog chroma signal are inputted after being separated from each other depending on a change-over signal a, 26 denotes a chrominance signal processing circuit which receives the output signal of the multiplexer circuit 25 and converts the chroma signal into primary color signals of an R-Y signal and a B-Y signal, and 27 and 28 denote a second DA converter and a third DA converter which receive the output signal of the chrominance signal processing circuit 26 and convert primary color signals of the R-Y signal and the B-Y signal in digital code into analog signals, respectively.

The operation of a video chroma signal processing circuit constructed as above will be described hereinafter.

First, an analog composite video signal or a luminance signal is inputted to the first AD converter 21 and converted into a digital code. The second AD converter 22 receives a chroma signal and converts it into a digital code. The luminance signal processing circuit 23 receives the output signal of the first AD converter 21 and performs appropriate luminance signal processing such as contrast adjustment and contour correction. The first DA converter 24 receives the output signal of the luminance signal processing circuit 23 and converts the digital code into an analog signal. As a result, an analog luminance signal is obtained as the output signal of the first DA converter 24. Further, the chrominance signal is reproduced as follows. The multiplexer circuit 25 receives the output signal of the first AD converter 21 and the output signal of the second AD converter 22, and then outputs the output signal of the first AD converter 21 at time of composite video signal demodulation and outputs the output signal of the second AD converter 22 when the luminance signal and the chrominance signal are inputted after being separated from each other in advance depending on the change-over signal a. The chrominance signal processing circuit 26 receives the output signal of the multiplexer circuit 25 and converts the chroma signal into primary color signals of an R-Y signal and a B-Y signal. The second DA converter 27 and the third DA converter 28 receive the output signals of the chrominance signal processing circuit 26 and convert primary color signals of the R-Y signal and the B-Y signal in digital code into analog signals, respectively.

In above-described construction, however, the signal frequency is limited to a band of approximately 7.1 MHz by the sampling theorem when 14.31818 MHz which is used frequently is adopted as a sampling frequency. This produces approximately 570 lines when computed in terms of the horizontal resolution. It is only required to raise the sampling frequency for obtaining a band wider than the above, but it is practically difficult to manufacture an AD converter of high accuracy at a frequency higher than the above, thus causing such problems that reproduction of a chrominance signal becomes complicated and the cost is also increased.

SUMMARY OF THE INVENTION

In view of above-described problems, it is an object of the present invention to provide a video chroma signal processing circuit which is capable of having an AD converter operated at a sampling frequency same as conventional and improving the horizontal resolution.

A video chroma signal processing circuit of the present invention includes:

a switch circuit which receives at one input either an analog composite video signal or an analog luminance signal and at another input an analog chroma signal and changes over depending on a change-over signal a to the analog composite video signal when the composite video signal is demodulated and to the analog chroma signal when the analog luminance signal and the analog chroma signal are input after being separated from each other;

a first AD converter which receives an analog composite video signal and converts it into a digital code;

a second AD converter which receives the output signal of the switch circuit, converts it into a digital code and performs sampling with a phase reverse to that of the first AD converter;

a first multiplexer circuit which receives the output signal of the first AD converter and the output signal of the second AD converter, outputs the output signal of the first AD converter and the output of the second AD converter alternately at a speed two times as high as that of a sampling clock when the analog composite video signal is selected and outputs the output signal of the first AD converter when the analog luminance signal and the chroma signal are inputted after being separated from each other in advance depending on a change-over signal b;

a second multiplexer circuit which receives the output signal of the first AD converter and the output signal of the second AD converter, outputs the output signal of the first AD converter when the analog composite video signal is selected and outputs the output signal of the second AD converter when the analog luminance signal and the chroma signal are inputted after being separated from each other in advance;

a low-pass filter which receives the output signal of the first multiplexer circuit and passes a frequency at one half and lower of that of the sampling clock;

a luminance signal processing circuit which receives the output signal of the low-pass filter and performs appropriate luminance signal processing such as contrast adjustment and contour correction;

a high-pass filter circuit which receives the output of the first multiplexer circuit, operates with a clock two times as high as the sampling clock and passes a frequency which is one-half and lower of that of the sampling clock;

a delay circuit which receives the output signal of the high-pass filter circuit and corrects the delay time of the luminance signal processing circuit;

an adding circuit which receives the output signal of the luminance signal processing circuit and the output signal of the delay circuit, adds two input signals when the analog composite video signal is selected and outputs only the output signal of the luminance signal processing circuit when the analog luminance signal and the chroma signal are inputted after being separated from each other in advance depending on a change-over signal b;

a first DA converter which receives the output signal of the adding circuit and converts a digital code into an analog signal with a clock two times as high as the sampling clock;

a chrominance signal processing circuit which receives the output signal of the second multiplexer circuit and converts a chroma signal into primary color signals of an R-Y signal and a B-Y signal; and a second DA converter and a third DA converter which receive the output signal of the chrominance signal processing circuit and converts primary color signals of the R-Y signal and the B-Y signal in digital code into analog signals.

With above-described construction according to the present invention, two AD converters are operated with sampling clocks having reverse phases to each other, thereby to improve the frequency band of the luminance signal to two times so as to make it possible to reproduce up to the same frequency as the sampling clocks. Further, it becomes possible to construct a video chroma signal processing circuit corresponding also to a system in which a luminance signal and a chrominance signal are inputted in advance without increasing hardware by a large margin.

DESCRIPTION OF THE PREFERRED EMBODIMENT

Figure 1:
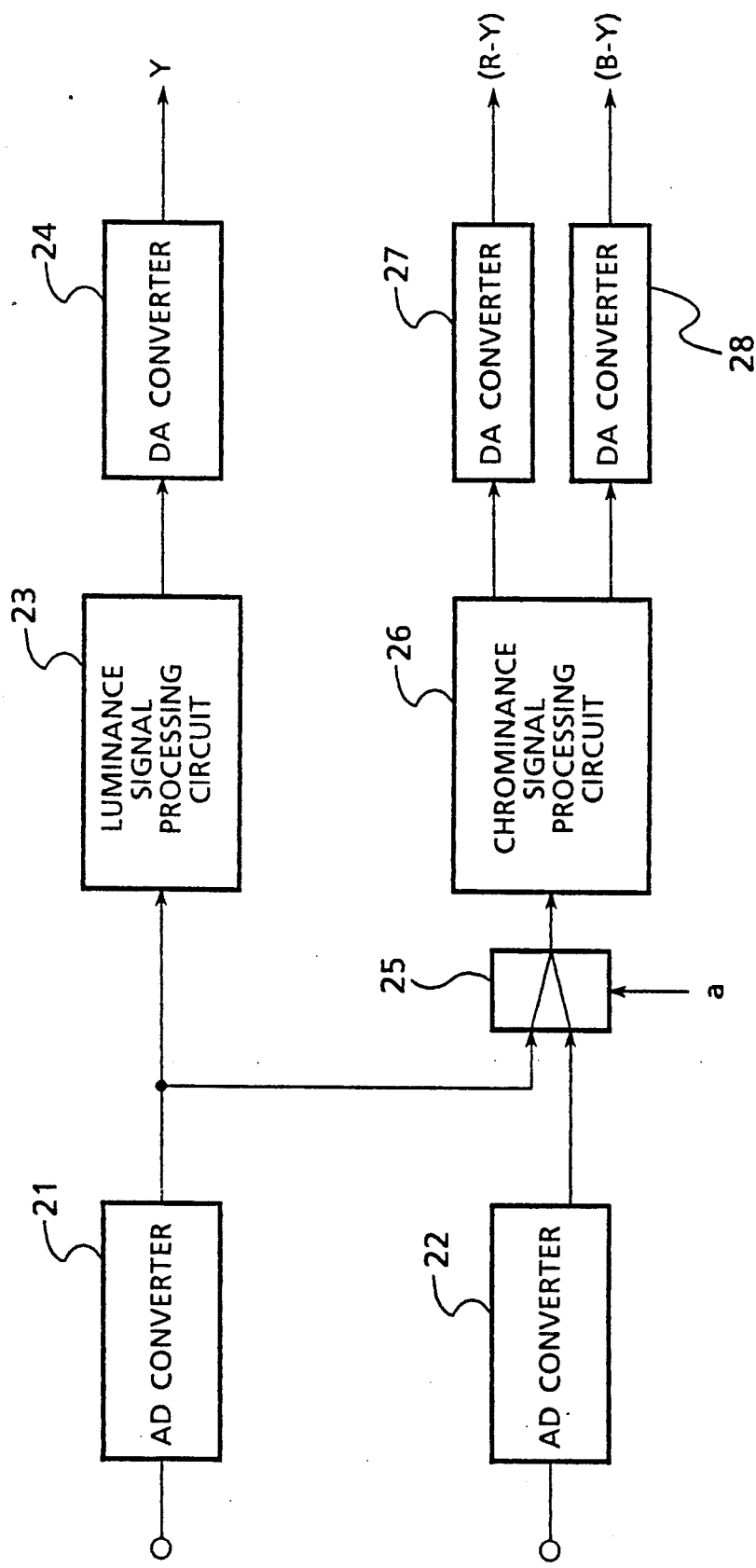
FIG. 1 is a block diagram of a conventional video chroma signal processing circuit.

An embodiment of the present invention will be described hereinafter with reference to the drawing.

Figure 2:
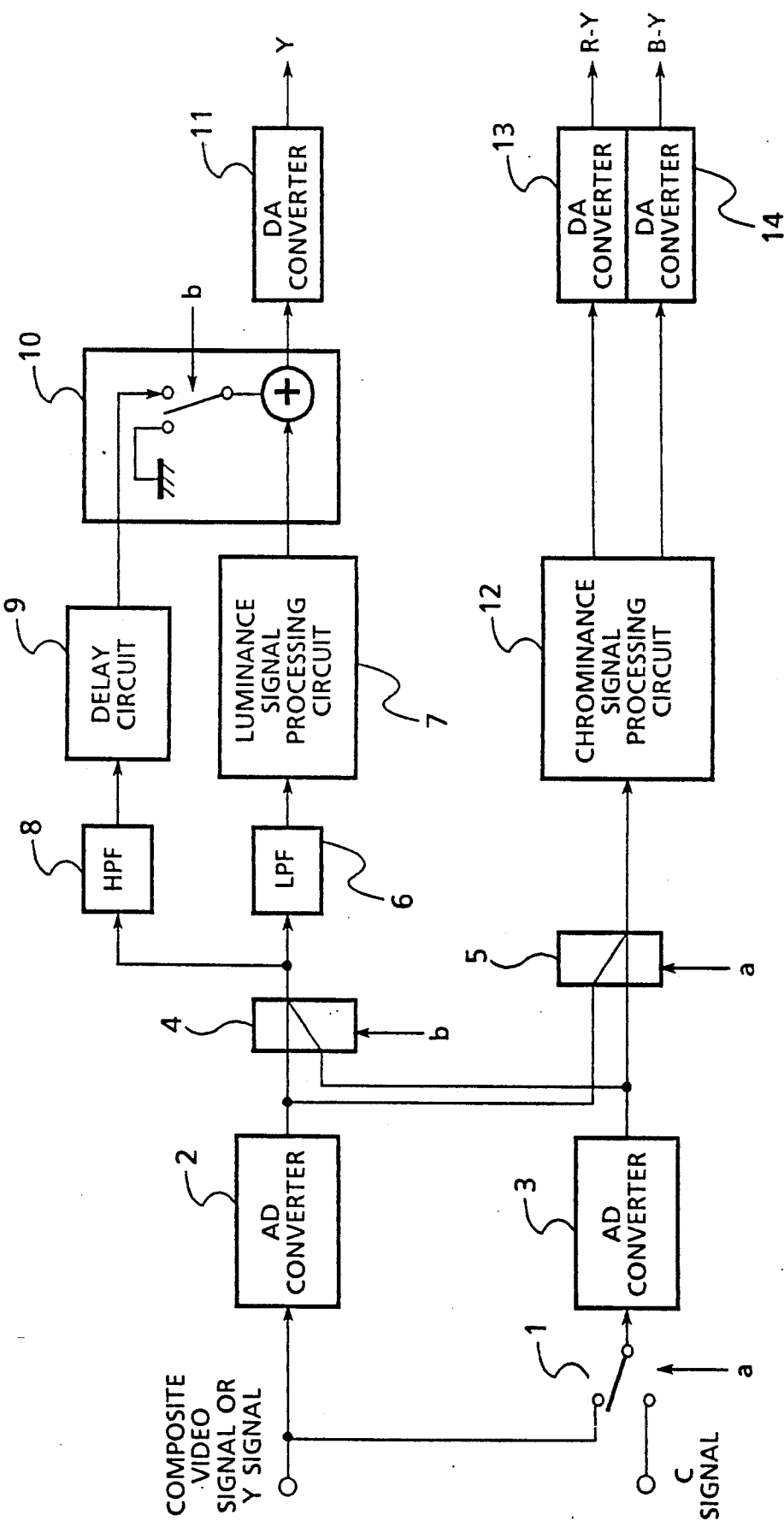
FIG. 2 is a block diagram showing an embodiment of a video chroma signal processing circuit of the present invention.

FIG. 2 is a block diagram showing an embodiment of a video chroma signal processing circuit of the present invention. In FIG. 2, a reference numeral 1 denotes a switch circuit which receives at one input an analog composite video signal or an analog luminance signal and at another input an analog chroma signal and changes over to the analog composite video signal when the composite video signal is demodulated and to an analog luminance signal when an analog luminance signal and a chroma signal separated from each other in advance are inputted depending on a change-over signal a. denotes a first AD converter which receives the analog composite video signal and converts it into a digital code. 3 denotes a second converter which receives the output signal of the switch circuit 1, converts it into a digital code and performs sampling with a phase reverse to that of the first AD converter 2. 4 denotes a first multiplexer circuit which receives the output signal of the first AD converter 2 and the output signal of the second AD converter 3, outputs the output signal of the first AD converter 2 and the output signal of the second AD converter 3 alternately at a speed two times as high as that of a sampling clock when the composite video signal is selected and outputs the output signal of the first AD converter 2 when the luminance signal and the chroma signal are inputted after being separated from each other in advance depending on a change-over signal b. 5 denotes a second multiplexer circuit which receives the output signal of the first AD converter 2 and the output signal of the second AD converter 3, outputs the output signal of the first AD converter 2 when the composite video signal is selected and outputs the output signal of the second AD converter 3 when the luminance signal and the chroma signal are inputted after being separated from each other in advance depending on the change-over signal a. 6 denotes a low-pass filter which receives the output signal of the first multiplexer circuit 4, and passes frequencies not higher than one half the sampling clock. 7 denotes a luminance signal processing circuit which receives the output signal of the low-pass filter 6 and performs appropriate luminance signal processing such as contrast adjustment and contour correction. 8 denotes a high-pass filter circuit which receives the output of the first multiplexer circuit 4, operates with a clock two times as high as the sampling clock and passes frequencies higher than one half of the sampling clock. 9 denotes a delay circuit which receives the output signal of the high-pass filter circuit 8 and corrects the delay time of the luminance signal processing circuit. 10 denotes an adding circuit which receives the output signal of the luminance signal processing circuit 7 and the output signal of the delay circuit 9, adds two input signals when the composite video signal is selected and outputs only the output signal of the luminance signal processing circuit when the luminance signal and the chroma signal are inputted after being separated from each other in advance depending on the change-over signal b. 11 denotes a first DA converter which receives the output signal of the adding circuit 10 and converts a digital code into an analog signal with a clock two times as high as the sampling clock. 12 denotes a chrominance signal processing circuit which receives the output signal of the second multiplexer circuit 5 and converts the chroma signal into primary color signals of an R-Y signal and a B-Y signal. 13 and 14 denote a second DA converter and a third DA converter which receive the output signal of the chrominance signal processing circuit 12 and convert primary color signals of an R-Y signal and a B-Y signal in digital code into analog signals, respectively.

The operation of a video chroma signal processing circuit constructed as stated above will be described hereinafter.

The analog composite video signal is inputted to the AD converter 2, and passes through the switch circuit 1, depending on the change-over signal a and is inputted to the second AD converter 3. The first AD converter 2 and the second AD converter 3 are operated by sampling clocks having reverse phases to each other. When the luminance signal and the chrominance signal are inputted after being separated from each other in advance, the analog chroma signal passes through the switch circuit 1 depending on the change-over signal a and is inputted to the second AD converter 3. The first multiplexer circuit 4 receives the output signal of the first AD converter 2 and the output signal of the second AD converter 3. Here, the output signal of the first AD converter 2 and the output signal of the second AD converter 3 are outputted alternately at a speed two times as fast as the sampling clock depending on the change-over signal b when the composite video signal is selected, thereby to output a data array which is equivalent to that when sampling is made equivalently with a clock two times as high as the sampling clock. On the other hand, the output signal of the first AD converter 2 is outputted when the luminance signal and the chroma signal are inputted after being separated from each other in advance. Further, the second multiplexer 5 receives the output signal of the first AD converter 2 and the output signal of the second AD converter 3. Here, the output signal of the first AD converter 2 is outputted by the change-over signal a when the composite video signal is selected. On the other hand, the output signal of the second AD converter 3 is outputted when the luminance signal and the chroma signal are inputted after being separated from each other in advance. Next, the low-pass filter 6 receives the output signal of the first multiplexer circuit 4 and passes frequencies not higher than one half of the sampling clock. The output signal of the low-pass filter 6 is inputted to the luminance signal processing circuit 7 where appropriate luminance signal processing such as contrast adjustment and contour correction is performed. Further, the output of the first multiplexer circuit 4 is inputted to the highpass filter circuit 8, which is operated with a clock two times as high as the sampling clock, thereby to pass high band frequency components not lower than one half of the sampling clock. The output signal of the high-pass filter circuit 8 is inputted to the delay circuit 9, where the delay time of the luminance signal processing circuit 7 is corrected. Then, the output signal of the luminance signal processing circuit 7 and the output signal of the delay circuit 9 are inputted to the adding circuit 10, and two input signals are added to each other when the composite video signal is selected and only the output signal of the luminance signal processing circuit 7 is outputted when the luminance signal and the chroma signal are inputted after being separated from each other in advance depending on the change-over signal b. A high band component and a low band component are added to each other by such an operation, thereby to produce or synthesize a luminance signal having a band two times as wide as that of the sampling clock. The output signal of the adding circuit 10 is inputted to the first DA converter 11, and the digital code is converted into an analog signal with a clock two times as high as the sampling clock. On the other hand, as to the chrominance signal, the output signal of the second multiplexer circuit 5 is inputted to the chrominance signal processing circuit 12, and the chroma signal is converted into primary color signals to the R-Y signal and the B-Y signal. The output signals of the chrominance signal processing circuit 12 are inputted to the second DA converter 13 and the third DA converter 14, and primary color signals of the R-Y signal and the B-Y signal in digital codes are converted into analog signals.

In this manner, the two AD converters are operated in reverse phases to each other when a composite video signal is inputted for operation, thus making it possible to construct a video chroma signal processing circuit which is capable of reproducing up to a frequency same as the sampling clock frequency.

In order to realize such a construction strictly, characteristics of two AD converters, in particular linearities thereof have to be equal, but there is no problem for the low band component when the luminance signal processing circuit 7 is operated with the sampling clock or linearity forming components are attenuated by the low-pass filter 6. The high band components exert no influences when the frequency components of the sampling clock are attenuated by the high-pass filter 8.

Besides, the output signal of the first multiplexer 4 has been inputted as the input signal of the low-pass filter 6, but the same effect is obtainable by inputting the output signal of the first AD converter 2 and operating the luminance signal processing circuit 7 at a frequency same as that of the sampling clock.

As described above, according to the present invention, there are provided:
    a switch circuit which receives at one input either an analog composite signal or an analog luminance signal and at another input an analog chroma signal and changes over depending on a change-over signal a to the analog composite video signal when the composite video signal is demodulated and to an analog chroma signal when the luminance signal and the chroma signal are inputted after being separated from each other in advance;

a first AD converter which receives an analog composite video signal and converts it into a digital code;

a second AD converter which receives the output signal of the switch circuit, converts it into a digital code and performs sampling with a phase reverse to that of the first AD converter;

a first multiplexer circuit which receives the output signal of the first AD converter and the output signal of the second AD converter, outputs the output signal of the first AD converter and the output of the second AD converter alternately at a speed two times as high as that of a sampling clock when the analog composite video signal is selected and outputs the output signal of the first AD converter when the analog luminance signal and the chroma signal are inputted after being separated from each other in advance depending on a change-over signal b;

a second multiplexer circuit which receives the output signal of the first AD converter and the output signal of the second AD converter, outputs the output signal of the first AD converter when the analog composite video signal is selected and outputs the output signal of the second AD converter when the analog luminance signal and the chroma signal are inputted after being separated from each other in advance depending on change-over signal a;

a low-pass filter which receives the output signal of the first multiplexer circuit and passes a frequency at one half and lower of that of the sampling clock;

a luminance signal processing circuit which receives the output signal of the low-pass filter and performs appropriate luminance signal processing such as contrast adjustment and contour correction;

a high-pass filter circuit which receives the output of the first multiplexer circuit, operates with a clock two times as high as the sampling clock and passes a frequency which is one-half and lower of that of the sampling clock;

a delay circuit which receives the output signal of the high-pass filter circuit and corrects the delay time of the luminance signal processing circuit;

an adding circuit which receives the output signal of the luminance signal processing circuit and the output signal of the delay circuit, adds two input signals when the analog composite video signal is inputted and outputs only the output signal of the luminance signal processing circuit when the analog luminance signal and the chroma signal are inputted after being separated from each other in advance depending on a change-over signal b;

a first DA converter which receives the output signal of the adding circuit and converts a digital code into an analog signal with a clock two times as high as the sampling clock;

a chrominance signal processing circuit which receives the output signal of the second multiplexer circuit and converts a chroma signal into primary color signals of an R-Y signal and a B-Y signal; and a second DA converter and a third DA converter which receive the output signal of the chrominance signal processing circuit and converts primary color signals of the R-Y signal and the B-Y signal in digital code into analog signals; thereby enabling it to construct a video chroma signal processing circuit in which the two AD converters are operated in reverse phases to each other when a composite video signal is inputted for operation, and which is able to reproduce up to a frequency same as the frequency of the sampling clock.

We claim:

1. A video chroma signal processing circuit, comprising:

a first AD converter which receives an analog composite video signal and converts it into a digital code;

a second AD converter which receives said analog composite video signal, converts it into a digital code and performs sampling in a phase reverse to that of said first AD converter;

a multiplexer circuit which receives the output signal of said first AD converter and the output signal of said second AD converter and outputs both output signals alternately at a speed two times as high as that of a sampling clock;

a low-pass filter which receives the output signal of said multiplexer circuit and passes frequencies not higher than one half of the sampling clock;

a luminance signal processing circuit which receives the output signal of said low-pass filter and performs luminance signal processing;

a high-pass filter circuit which receives the output of said multiplexer circuit, operates with a clock two times as high as the sampling clock and passes frequencies not lower than one half of the sampling clock;

a delay circuit which receives the output signal of said high-pass filter circuit and corrects the delay time of the luminance signal processing circuit;

an adding circuit which adds the output signal of said luminance signal processing circuit and the output signal of said delay circuit to each other;

a first DA converter which receives the output signal of said adding circuit and converts it into an analog signal with a clock two times as high as the sampling clock;

a chrominance signal processing circuit which receives the output signal of said first AD converter and converts a chroma signal into primary color signals of an R-Y signal and a b-Y signal; and a second DA converter and a third DA converter which receive the output signals of said chrominance signal processing circuit and convert primary color signals of the R-Y signal and the B-Y signal in digital code into analog signals.

2. A video chroma signal processing circuit according to claim 1, wherein the output signal of said first AD converter is inputted as the input signal of the low-pass filter in place of the output signal of said first multiplexer circuit.

3. A video chroma signal processing circuit according to claim 1, wherein said luminance signal processing circuit performs at least one of contrast adjustment and contour correction.

4. A video chroma signal processing circuit, comprising:

a switch circuit which receives at one input either an analog composite video signal or an analog luminance signal and at another input an analog chroma signal and changes over to the analog composite video signal when the composite video signal is demodulated and to the analog chroma signal when the analog luminance signal and the analog chroma signal are inputted after being separated from each other;

a first AD converter which receives the analog composite video signal and converts it into a digital code;

a second AD converter which receives the output signal of said switch circuit, converts the output signal into a digital code and performs sampling in a phase reverse to that of said first AD converter;

a first multiplexer circuit which receives the output signal of said first AD converter and the output signal of said second AD converter, outputs the output signal of said first AD converter and the output signal of said second AD converter alternately at a speed two times as fast as that of the sampling clock and outputs the output signal of the first AD converter when the analog luminance signal and the analog chroma signal are inputted after being separated from each other;

a second multiplexer circuit which receives the output signal of said first AD converter and the output signal of said second AD converter and outputs the output signal of said first AD converter in case of a double density mode and outputs the output signal of the second AD converter when the analog luminance signal and the analog chroma signal are inputted after being separated from each other;

a low-pass filter which receives the output signal of said first multiplexer circuit and passes frequencies not higher than one half of the sampling clock;

a luminance signal processing circuit which receives the output signal of said low-pass filter and performs luminance signal processing;

a high-pass filter circuit which receives the output of said first multiplexer circuit, operates with a clock two times as high as the sampling clock and passes frequencies not lower than one half of the sampling clock;

a delay circuit which receives the output of said high-pass filter and corrects the delay time of said luminance signal processing circuit;

an adding circuit which receives the output signal of said luminance signal processing circuit and the output signal of said delay circuit, adds two input signals in case of a double density mode and outputs only the output signal of said luminance signal processing circuit when the analog luminance signal and the analog chroma signal are inputted after being separated from each other;

a first DA converter which receives the output signal of said adding circuit and converts a digital code into an analog signal with a clock two times as high as the sampling clock;

a chrominance signal processing circuit which receives the output signal of said second multiplexer circuit and converts the chroma signal into primary color signals of an R-Y signal and a B-Y signal; and a second DA converter and a third DA converter which receive the output signals of said chrominance signal processing circuit and convert primary color signals of the R-Y signal and the B-Y signal in digital code into analog signals.

5. A video chroma signal processing circuit according to claim 4, wherein said luminance signal processing circuit performs at least one of contrast adjustment and contour correction.

* * * * *